(12) United States Patent
Wang et al.

(10) Patent No.: US 11,854,172 B2
(45) Date of Patent: Dec. 26, 2023

(54) COLOR CONTRAST ENHANCED RENDERING METHOD, DEVICE AND SYSTEM SUITABLE FOR OPTICAL SEE-THROUGH HEAD-MOUNTED DISPLAY

(71) Applicant: ZHEJIANG UNIVERSITY, Hangzhou (CN)

(72) Inventors: Rui Wang, Hangzhou (CN); Hujun Bao, Hangzhou (CN); Yunjin Zhang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 154 days.

(21) Appl. No.: 17/627,671

(22) PCT Filed: Jan. 6, 2021

(86) PCT No.: PCT/CN2021/070529
§ 371 (c)(1),
(2) Date: Jan. 15, 2022

(87) PCT Pub. No.: WO2021/184931
PCT Pub. Date: Sep. 23, 2021

(65) Prior Publication Data
US 2022/0261969 A1    Aug. 18, 2022

(30) Foreign Application Priority Data

Mar. 16, 2020   (CN) .......................... 202010181920.3

(51) Int. Cl.
*G06T 7/90* (2017.01)
*G06T 5/00* (2006.01)

(52) U.S. Cl.
CPC .............. *G06T 5/007* (2013.01); *G06T 7/90* (2017.01); *G06T 2207/10016* (2013.01)

(58) Field of Classification Search
None
See application file for complete search history.

(56) References Cited

U.S. PATENT DOCUMENTS

2017/0323438 A1    11/2017  Honeck et al.
2019/0005652 A1*    1/2019  Pham ........................ G06T 7/90

FOREIGN PATENT DOCUMENTS

| CN | 103581571 | 2/2014 |
| CN | 108806600 | 11/2018 |
| CN | 110419061 | 11/2019 |

\* cited by examiner

*Primary Examiner* — Nicholas R Wilson
(74) *Attorney, Agent, or Firm* — Jiwen Chen; Joywin IP Law PLLC

(57) ABSTRACT

The present invention discloses a color contrast enhanced rendering method, device and system suitable for an optical see-through head-mounted display. The method includes: (1) acquiring a background environment in real time to obtain a background video and performing Gaussian blur and visual field correction on the video; (2) converting an original rendering color and a processed video color from an RGB color space to a CIELAB color space scaled to a unit sphere range; (3) finding an optimal rendering color based on the original rendering color and the processed video color in the scaled CIELAB space according to a set color difference constraint, a chromaticity saturation constraint, a brightness constraint and a just noticeable difference constraint; and (4) after converting the optimal rendering color back to the RGB space, performing real-time rendering by using the optimal rendering color of the RGB space. The method is widely applied and capable of obviously improving the discrimination between a virtual content and a background environment and supporting various virtual scenes and background environments without a pre-preparation process.

8 Claims, 1 Drawing Sheet

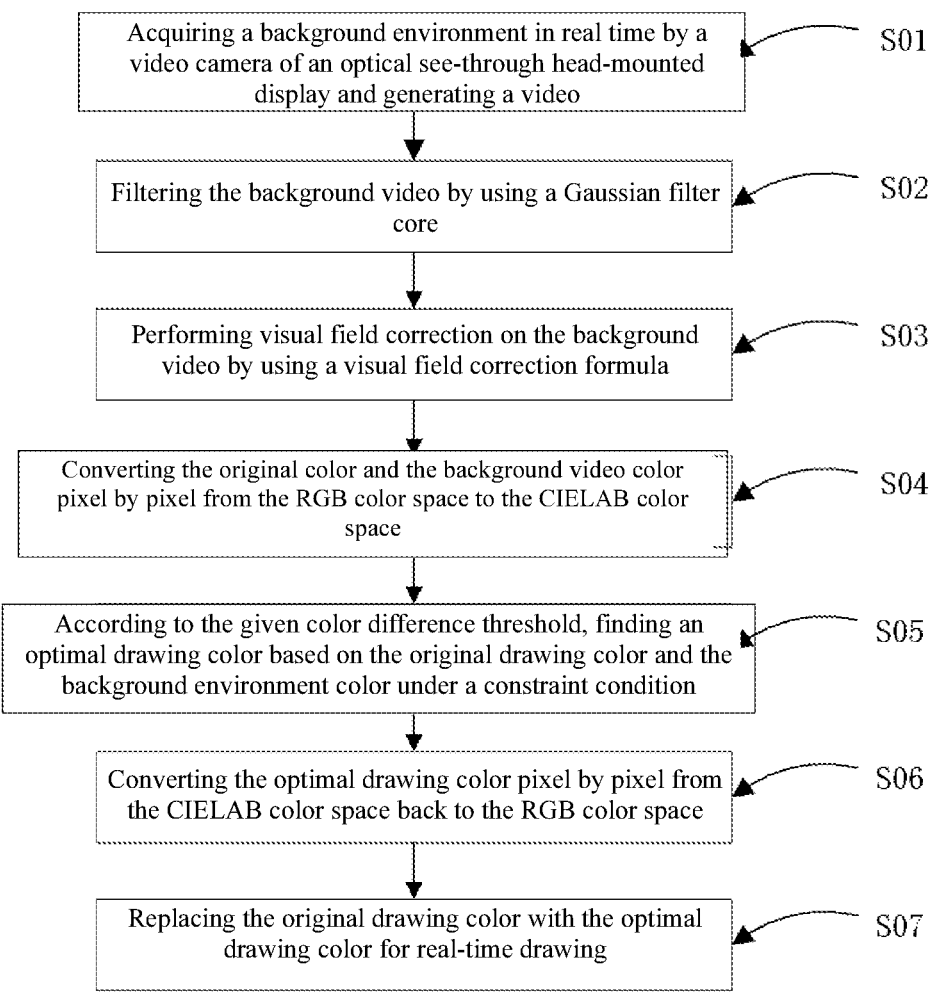

COLOR CONTRAST ENHANCED RENDERING METHOD, DEVICE AND SYSTEM SUITABLE FOR OPTICAL SEE-THROUGH HEAD-MOUNTED DISPLAY

This is a U.S. national stage application of PCT Application No. PCT/CN2021/070529 under 35 U.S.C. 371, filed Jan. 6, 2021 in Chinese, claiming priority to Chinese Patent Applications No. 202010181920.3, filed Mar. 16, 2020, all of which are hereby incorporated by reference.

TECHNICAL FIELD

The present invention belongs to the field of real-time rendering, and in particular, relates to a color contrast enhanced rendering method, device and system suitable for an optical see-through head-mounted display.

BACKGROUND TECHNOLOGY

With the continuous innovation of optical see-through head-mounted displays (hereinafter OST-HMD for short), the related mixed reality (hereinafter MR for short) is also developed continuously. Different from the conventional virtual reality head-mounted display or video see-through head-mounted display, the OST-HMD has a semitransparent optical lens, so the OST-HMD may present real and non-drawn ambient environments and virtual and drawn display contents at the same time. This design enables a user to perceive the surrounding environment without delay and with high fidelity when wearing the OST-HMD, so that the discomfort of the user who wears the video see-through head-mounted display is greatly alleviated, but new problems ensued. The optical structure of the OST-HMD makes the OST-HMD unable to completely block light from the external environment, so that the virtual drawn content cannot be independently presented on the display. In the MR application scene, the optical design will lead to the so-called color-blending problem, that is, since the virtual display content and the color of the real background environment are blended, the virtual content becomes difficult to see clearly, especially when there is a low color contrast between the virtual content and the background environment.

Under such a background, it has become a practical demand to enhance the discrimination between the virtual display content and the real background environment. However, there is no universal solution suitable for the mainstream commercial OST-HMD at present, and there are many possibilities to be explored in this direction. In the related strategies to relieve the color-blending problem on the OST-HMD, controlling the opaqueness of a display pixel by increasing an additional hardware system has been proved to be an effective hardware solution. In such a solution, complete or partial blocking effect between the virtual display content and the real background environment may be achieved by adjusting the opaqueness of the display pixel, so that the discrimination between the virtual display content and the real background environment is improved. However, this hardware solution usually does not have scalability and is difficult to realize the miniaturization of equipment overall dimension, and the production cost is high.

In addition to the hardware solution, some software solutions perform accurate pixel-level matching on the display picture and the background environment to subtract the color component of the real background environment from the virtual display content, so that the real background environment corresponding to the mixed virtual display content is almost invisible and the discrimination between the display picture and the background environment is finally improved. However, the solution for the mainstream commercial OST-HMD is adopted in the daily environment to reduce the brightness of the virtual display content, so that the transparency of the virtual display content is increased, and the discrimination between the virtual display content and the real background environment is reduced.

However, there is also a software solution for the mainstream commercial OST-HMD to increase the opaqueness of the virtual display content by enhancing the brightness of the virtual display content, so that the discrimination between the virtual display content and the real background environment is improved. However, this solution will reduce the contrast of the virtual display content itself and lose the specific details, so this solution is not suitable for the virtual content with complex texture and has low universality.

SUMMARY OF THE INVENTION

An object of the present invention is to provide a color contrast enhanced rendering method, device and system suitable for an optical see-through head-mounted display. According to the color contrast enhanced rendering method, an optimal rendering color based on an original rendering color and a background environment color is found pixel by pixel under the condition of meeting a series of constraint conditions.

The technical solution of the present invention is as follows:

A color contrast enhanced rendering method suitable for an optical see-through head-mounted display comprises the following steps:

(1) acquiring a background environment in real time to obtain a background video and pre-processing the background video to obtain a processed background video;

(2) converting an original rendering color and a processed background video color from their own color spaces to a CIELAB color space;

(3) finding an optimal rendering color based on the original rendering color and the processed video color in the CIELAB space according to a set color difference constraint, a chromaticity saturation constraint, a brightness constraint and a just/minimum noticeable difference constraint; and (4) after converting the optimal rendering color from the CIELAB color space back to the original rendering color space, replacing the original rendering color with the converted optimal rendering color for real-time rendering.

The original rendering color refers to an original color displayed by the OST-HMD on its display screen before this technical solution is applied; the original rendering color space refers to a color space adopted by the original rendering color; the background video color refers to a color of a video of a background environment behind the OST-HMD acquired by video acquisition equipment (such as a camera); the background video color space refers to a color space adopted by the background video color; and converting the original rendering color and the processed background video color from their own color spaces to the CIELAB color space refers to that the original rendering color is converted from the original rendering color space to the CIELAB color space and the background video color is converted from the video color space to the CIELAB color space. The original rendering color space may be a color space such as RGB, HSV, YUV, CIEXYZ and CIELAB, and the video color space may be a color space such as RGB, HSV, YUV and YCbCr.

Preferably, the step of pre-processing the background video comprises:

performing Gaussian blur processing on the background video, specifically, filtering the background video by using a Gaussian filter core to obtain a blur effect, wherein the mathematical description of the Gaussian filter core is as follows:

$$G(x, y) = \frac{1}{2\pi\sigma^2} e^{-\frac{x^2+y^2}{2\sigma^2}}$$

wherein x and y respectively represent horizontal and vertical distances from the pixel to a center pixel, and $\sigma$ represents a standard deviation of the selected Gaussian distribution;

performing visual field correction on the background video subjected to Gaussian processing to realize pixel accuracy one-to-one mapping of a frame image of the background video and a rendering picture, wherein a correction formula is:

$$\begin{cases} u = s_u x + b_u \\ v = s_v y + b_v \end{cases}$$

wherein u and v respectively represent texture coordinates of the rendering picture in horizontal and vertical directions, x and y respectively represent texture coordinates of the frame image of the background video in the horizontal and vertical directions, $s_u$ and $s_v$ respectively represent scaling coefficients of the texture coordinates of the frame image of the background video in the horizontal and vertical directions, and $b_u$ and $b_v$ respectively represent offsets of the texture coordinates of the frame image of the background video in the horizontal and vertical directions.

The step (2) specifically includes:

(2-1) converting the original rendering color and the processed background video color from their own original color spaces to the CIELAB color space; and (2-2) scaling the three-dimensional coordinates of the original rendering color and the background video color in the CIELAB color space to a unit sphere range, that is, an Euclidean distance from the three-dimensional coordinates corresponding to any color in the CIELAB color space after scaling to the origin is less than or equal to 1.

In the step (3), the color difference constraint means that a color difference of the optimal rendering color and the original rendering color should be kept within a certain range, and the color different constraint is defined as follows:

$$\Delta E^*_{ab}(l_{opt}, l_d) \leq \lambda_E$$

wherein $\Delta E^*_{ab}(\cdot)$ represents the color difference of the two colors in the CIELAB color space, $l_{opt}$ and $l_d$ respectively represent the optimal rendering color and the original rendering color, and $\lambda_E$ represents a color difference threshold with a positive value;

the chromaticity saturation constraint means that a chromaticity saturation of the optimal rendering color should not be reduced, and the chromaticity saturation constraint is defined as follows:

$$ch_{opt} - ch_d \geq 0$$

wherein $ch_{opt}$ and $ch_d$ respectively represent chromaticity saturations of the optimal rendering color and the original rendering color in the CIELAB color space;

the brightness constraint means that a brightness difference of the optimal rendering color and the original rendering color should be kept within a certain range, and the brightness constraint is defined as follows:

$$\Delta L^*(l_{opt}, l_d) \leq \lambda_L$$

wherein $\Delta L^*(\cdot)$ represents the brightness difference of the two colors in the CIELAB color space, and $\lambda_L$ represents a brightness threshold with a positive value; and the just noticeable difference constraint means that the optimal rendering color and the background video color should have a color difference distinguishable by human eyes, and the just noticeable difference constraint is defined as follows:

$$\Delta E^*_{ab}(l_{opt}, l_d) \geq \lambda_{JND}$$

wherein $l_b$ represents the background video color, and $\lambda_{JND}$ represents a just noticeable difference with a positive value.

The step (3) step specifically comprises:

(3-1) calculating an ideal optimal rendering color by using the following formula:

$$I = -\frac{B}{dist(B, O)} = -norm(\overrightarrow{OB})$$

wherein I and B respectively represent three-dimensional coordinates of the ideal optimal rendering color and the background video color subjected to Gaussian blur in the CIELAB color space which is scaled to a unit sphere, O represents an origin of coordinates and, O is also a center of the unit sphere, dist($\cdot$) represents an Euclidean distance between two points in the space, norm($\cdot$) represents that a vector is normalized, $\overrightarrow{OB}$ represents a vector with a starting point at O and an end point at B; and (3-2) applying the color difference constraint to the ideal optimal rendering color, wherein the method for applying the color difference constraint is as follows:

$$\overrightarrow{DE} = \min(dist(D,I), \lambda'_E) \cdot norm(\overrightarrow{DI})$$

wherein D and E respectively represent three-dimensional coordinates of the original rendering color and the ideal optimal rendering color to which the color difference constraint is applied in the CIELAB color range scaled to the unit sphere, min($\cdot$) represents taking a smaller value of the two three-dimensional coordinates, $\lambda'_E$ represents a color different threshold scaled to the unit sphere range, and $\overrightarrow{DI}$ represents a three-dimensional vector with a starting point at D and an end point at I;

(3-3) continuing to apply the chromaticity saturation constraint to the ideal optimal rendering color to which the color difference constraint is applied, and making a superscript ' represent taking a projection vector of a vector on a a*Ob* plane in the CIELAB color space, wherein the method for applying the chromaticity saturation constraint is as follows:

$$\overrightarrow{DC} = t_{ch} \cdot \overrightarrow{DE'}_{ch} + \overrightarrow{DE'}_h$$

-continued $$t_{ch} = \begin{cases} 1, & \text{if } \theta_{ch} \leq 90° \\ 0, & \text{if } \theta_{ch} > 90° \end{cases}$$

wherein $\overrightarrow{DC}$ represents a $\overrightarrow{DE'}$ vector after the chromaticity saturation constraint is applied, $DE'_{ch}$ represents a vector component of a $\overrightarrow{DE'}$ vector in a $\overrightarrow{OD'}$ vector direction, that is, a variation vector of the chromaticity saturation constraint, $\overrightarrow{DE'}_h$ represents another vector component of the $\overrightarrow{DE'}$ in a direction vertical to the $\overrightarrow{DE'}_{ch}$, vector, that is, $\overrightarrow{DE'}_h = \overrightarrow{DE'} - \overrightarrow{DE'}_{ch}$, and $\theta_{ch}$ represents an angle from the $\overrightarrow{OD'}$ vector to the $\overrightarrow{DE'}$ vector;

(3-4) continuing to apply the brightness constraint to the ideal optimal rendering color to which the color different constraint and the chromaticity saturation constraint are applied, wherein the method for applying the brightness constraint is as follows:

$$\overrightarrow{DL} = (1 - |\cos \theta_l|) \cdot \overrightarrow{DE}_{L^*}$$

wherein $\overrightarrow{DE}_{L^*}$ represents a vector component of a $\overrightarrow{DE}$ vector on a L* axis in the CIELAB color space scaled to the unit sphere, $\overrightarrow{DL}$ represents a $\overrightarrow{DE}_{L^*}$ vector after the brightness constraint is applied, $\theta_l$ represents an angle from a positive direction of the L* axis to the $\overrightarrow{DE}$ vector; and (3-5) continuing to apply the just noticeable difference constraint to the ideal optimal rendering color to which the color different constraint, the chromaticity saturation constraint and the brightness constraint are applied, wherein the method for applying the just noticeable difference constraint is as follows:

$$\overrightarrow{DP} = \overrightarrow{DC} + \overrightarrow{DL}$$

$$L_{opt} = D + r \cdot \overrightarrow{DP}$$

wherein $L_{opt}$ represents three-dimensional coordinates of the optimal rendering color in the CIELAB color space scaled to the unit sphere, and r represents a scaling coefficient: when an Euclidean distance from P to B is less than the just noticeable difference scaled to the unit sphere range, r is less than 1, so as to reduce a module length of a $\overrightarrow{DP}$ vector with a starting point at D and an end point at P, so that an Euclidean distance from the end point of the reduced $\overrightarrow{DP}$ vector to B is not less than the just noticeable difference scaled to the unit sphere range, and if an Euclidean distance from the P to the B is already greater than or equal to the just noticeable difference scaled to the unit sphere unit, r is equal to 1.

The step (4) specifically comprises:

(4-1) scaling the optimal rendering color in the CIELAB color space scaled to the unit sphere range back to a coordinate range of the original CIELAB color space;

(4-2) converting the optimal rendering color in the CIELAB color space back to the original rendering color space; and (4-3) replacing the original rendering color with the converted optimal rendering color for real-time rendering.

In the present invention, the background environment may be acquired in real time by a video camera of the OST-HMD, only the color difference threshold $\lambda_E$ and the just noticeable difference $\lambda_{JND}$ need to be determined by a user, and other parameters such as the brightness threshold $\lambda_L$ are automatically set by the present invention during operation.

A color contrast enhanced rendering device suitable for an optical see-through head-mounted display comprises:

an acquisition and processing module, configured to acquire a background environment in real time to obtain a background video and perform Gaussian blur and visual field correction on the background video to obtain a processed background video;

a color space conversion module, configured to convert the original rendering color and the processed background video color from their own original color spaces to a CIELAB color space, and further configured to convert the optimal rendering color from the CIELAB color space to the original rendering color space;

an optimal rendering color calculation module, configured to find an optimal rendering color based on the original rendering color and the processed video color in the CIELAB space according to a set color difference constraint, a chromaticity saturation constraint, a brightness constraint and a just noticeable difference constraint; and a rendering module, configured to replace the original rendering color by the converted optimal rendering color for real-time rendering.

A color contrast enhanced rendering system suitable for an optical see-through head-mounted display processor comprises a memory and a computer program which is stored in the processor and capable of being executed by the processor, wherein the computer program, when being executed by the processor, implements the above color contrast enhanced rendering method suitable for the optical see-through head-mounted display.

Compared with the prior art, the present invention has the following beneficial effects:

the application range is wide and is not limited to a certain specific application program or certain specific hardware; the rendering method of the present invention is a full-screen post-processing effect, may be applied to rendering frameworks such as Vulkan, DirectX and OpenGL and other commercial game engines, and may also be popularized to various different OST-HMDs;

within the color difference threshold given by a user, by increasing the color contrast between the virtual display content and the real background environment, the discrimination between the virtual display content and the real background environment is improved on the premise of ensuring the presentation of the virtual content as much as possible, and the visibility reduction or detail loss of the virtual display content caused by the prior art is avoided; and the rendering method supports various mixed reality application scenes without any pre-preparation process and may be applied to various common background environments.

BRIEF DESCRIPTIONS OF THE DRAWINGS

In order to describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may also derive other drawings from these accompanying drawings without creative efforts.

FIG. 1 is a flowchart of a color contrast enhanced drawing method suitable for an optical see-through head-mounted display according to an embodiment of the present invention.

DETAILED DESCRIPTION OF EMBODIMENTS

In order to make the objectives, technical schemes and advantages of the present invention more clearly, the present invention will be further described below in detail with reference to the accompanying drawings and embodiments. It should be understood that the specific embodiments described herein are only used to explain the present invention and are not used to limit the protection scope of the present invention.

Referring to FIG. 1, a color contrast enhanced rendering method suitable for an optical see-through head-mounted display in this embodiment comprises the following steps:

S01: a background environment is acquired in real time by a video camera of the optical see-through head-mounted display to obtain a background video.

In this embodiment, a resolution ratio of the generated background video was 768×432, and a frame rate is 24 frames/second.

S02: the background video was filtered by using a Gaussian filter core to obtain a blur effect.

In this embodiment, the mathematical description of the Gaussian filter core required to perform Gaussian filtering is as follows:

$$G(x, y) = \frac{1}{2\pi\sigma^2} e^{-\frac{x^2+y^2}{2\sigma^2}}$$

wherein x and y respectively represent horizontal and vertical distances from the pixel to a center pixel, and $\sigma$ represents a standard deviation of the selected Gaussian distribution. In this embodiment, a standard deviation of the selected Gaussian distribution was 3.

S03: the background video was subjected to visual field correction by using a visual field correction formula.

In this embodiment, the visual field correction was defined as follows:

$$\begin{cases} u = s_u x + b_u \\ v = s_v y + b_v \end{cases}$$

wherein u and v respectively represent texture coordinates of the rendering picture in horizontal and vertical directions, x and y respectively represent texture coordinates of the frame image of the background video in the horizontal and vertical directions, $s_u$ and $s_v$ respectively represent scaling coefficients of the texture coordinates of the frame image of the background video in the horizontal and vertical directions, and $b_u$ and $b_v$ respectively represent offsets of the texture coordinates of the frame image of the background video in the horizontal and vertical directions. In this embodiment, the values of both $s_u$ and $s_v$ were 0.65, and the values of $b_u$ and $b_v$ were 0.13 and 0.17 respectively.

S04: the original rendering color and the background video color were converted from an RGB color space to an CIELAB color space pixel by pixel, the three-dimensional coordinates of the original rendering color and the background video color in the CIELAB color space were scaled to a unit sphere range, that is, an Euclidean distance from the three-dimensional coordinates corresponding to any color in the CIELAB color space after scaling to an origin was less than or equal to 1.

S05: according to a color different threshold given by a user, an optimal rendering color based on the original display color and the background video color was found pixel by pixel under the condition of meeting a series of constraint conditions.

In this embodiment, there were four constraint conditions, which were respectively defined as follows:

(a) a color difference constraint means that a color difference of the optimal rendering color and the original rendering color should be kept within a certain range, and the color different constraint was defined as follows:

$$\Delta E^*_{ab}(l_{opt}, l_d) \leq \lambda_E$$

wherein $\Delta E^*_{ab}(\bullet)$ represents the color difference of the two colors in the CIELAB color space, $l_{opt}$ and $l_d$ respectively represent the optimal rendering color and the original rendering color, and $\lambda_E$ represents a color difference threshold with a positive value;

(b) a chromaticity saturation constraint means that a chromaticity saturation of the optimal rendering color should not be reduced, and the chromaticity saturation constraint was defined as follows:

$$ch_{opt} - ch_d \geq 0$$

wherein $ch_{opt}$ and $ch_d$ respectively represent chromaticity saturations of the optimal rendering color and the original rendering color in the CIELAB color space;

(c) a brightness constraint means that a brightness difference of the optimal rendering color and the original rendering color should be kept within a certain range, and the brightness constraint was defined as follows:

$$\Delta L^*(l_{opt}, l_d) \leq \lambda_L$$

wherein $\Delta L^*(\bullet)$ represents the brightness difference of the two colors in the CIELAB color space, and $\lambda_L$ represents a brightness threshold with a positive value; and (d) a just noticeable difference constraint means that the optimal rendering color and the background video color should have a color difference distinguishable by human eyes, and the just noticeable difference constraint was defined as follows:

$$\Delta E^*_{ab}(l_{opt}, l_b) \geq \lambda_{JND}$$

wherein $l_b$ represents the background video color, and $\lambda_{JND}$ represents a just noticeable difference with a positive value.

The S05 specifically comprises:

S05-1: an ideal optimal rendering color was calculated. According to this embodiment, the ideal optimal rendering color was calculated by using the following formula:

$$I = -\frac{B}{dist(B, O)} = -norm(\overrightarrow{OB})$$

wherein I and B respectively represent three-dimensional coordinates of the ideal optimal rendering color and the background video color subjected to Gaussian blur in the CIELAB color space which was scaled to a unit sphere, O represents an origin of coordinates and, O is also a center of the unit sphere, dist(•) represents an Euclidean distance between two points in the space, norm(•) represents that a vector is normalized, $\overrightarrow{OB}$ represents a vector with a starting point at O and an end point at B; and S05-2: the color difference constraint was applied to the ideal optimal rendering color. The method for applying the color difference constraint was as follows:

$$\vec{DE} = \min(\text{dist}(D,I), \lambda'_E) \cdot \text{norm}(\vec{DI})$$

wherein D and E respectively represent three-dimensional coordinates of the original rendering color and the ideal optimal rendering color to which the color difference constraint was applied in the CIELAB color range scaled to the unit sphere, min(•) represents taking a smaller value of the two three-dimensional coordinates, $\lambda'_E$ represents a color different threshold scaled to the unit sphere range, and $\vec{DI}$ represents a three-dimensional vector with a starting point at D and an end point at I;

S05-3: the chromaticity saturation constraint was continuously applied to the ideal optimal rendering color to which the color difference constraint was applied. A superscript ' is made to represent taking a projection vector of a vector on a a*Ob* plane in the CIELAB color space. The method for applying the chromaticity saturation constraint was as follows:

$$\vec{DC} = t_{ch} \cdot \vec{DE}'_{ch} + \vec{DE}'_h$$

$$t_{ch} = \begin{cases} 1, & \text{if } \theta_{ch} \leq 90° \\ 0, & \text{if } \theta_{ch} > 90° \end{cases}$$

wherein $\vec{DC}$ represents a $\vec{DE}'$ vector after the chromaticity saturation constraint was applied, $\vec{DE}'_{ch}$ represents a vector component of a $\vec{DE}'$ vector in a $\vec{OD}'$ vector direction, that is, a variation vector of the chromaticity saturation constraint, $\vec{DE}'_h$ represents another vector component of the $\vec{DE}'$ in a direction vertical to the $\vec{DE}'_{ch}$ vector, that is, $DE'_h = \vec{DE}' - \vec{DE}'_{ch}$, and $\theta_{ch}$ represents an angle from the $\vec{OD}'$ vector to the $\vec{DE}'$ vector;

S05-4: the brightness constraint was continuously applied to the ideal optimal rendering color to which the color different constraint and the chromaticity saturation constraint were applied. The method for applying the brightness constraint was as follows:

$$\vec{DL} = (1 - |\cos \theta_l|) \cdot \vec{DE}_{L^*}$$

wherein $\vec{DE}_{L^*}$ represents a vector component of a $\vec{DE}$ vector on a L* axis in the CIELAB color space scaled to the unit sphere, $\vec{DL}$ represents a $\vec{DE}_{L^*}$ vector after the brightness constraint was applied, $\theta_l$ represents an angle from a positive direction of the L* axis to the $\vec{DE}$ vector.

S05-5: the just noticeable difference constraint was continuously applied to the ideal optimal rendering color to which the color different constraint, the chromaticity saturation constraint and the brightness constraint were applied. In this embodiment, the method for applying the just noticeable difference constraint was as follows:

$$\vec{DP} = \vec{DC} + \vec{DL}$$

$$L_{opt} = D + r \cdot \vec{DP}$$

wherein $L_{opt}$ represents three-dimensional coordinates of the optimal rendering color in the CIELAB color space scaled to the unit sphere, and r represents a scaling coefficient:

when an Euclidean distance from P to B was less than the just noticeable difference scaled to the unit sphere range, r was less than 1, so that a module length of a $\vec{DP}$ vector with a starting point at D and an end point at P was reduced, and an Euclidean distance from the end point of the reduced $\vec{DP}$ vector to B was not less than the just noticeable difference scaled to the unit sphere range, and if an Euclidean distance from the P to the B was already greater than or equal to the just noticeable difference scaled to the unit sphere unit, r was equal to 1. In this embodiment, the value of the just noticeable difference before scaling was 2.3.

S06: the optimal rendering color was converted from the CIELAB color space to a CIE XYZ color space pixel by pixel, and the optimal rendering color in the CIE XYZ color space was converted back to the RGB color space.

S07: the original rendering color was replaced by the optimal rendering color in the RGB color space for real-time rendering.

The experimental simulation result was as shown in Table 1 when the virtual display content was drawn by the method of this embodiment, wherein $\lambda'_E$ represents a color difference threshold given by a user. It may be seen that by the method of the present invention, a color contrast between a rendering color and a background color may be enhanced, so that a discrimination between the virtual content and the real background environment was obviously improved.

TABLE 1

| Color difference threshold | $\lambda'_E = 0.3$ | $\lambda'_E = 0.5$ | $\lambda'_E = 0.8$ |
|---|---|---|---|
| Area ratio of pixels with enhanced color contrast to rendering pixels in full screen | 73.83% | 87.62% | 92.72% |

An embodiment further provides a color contrast enhanced rendering device suitable for an optical see-through head-mounted display, including:

an acquisition and processing module, configured to acquire a background environment in real time to obtain a background video and perform Gaussian blur and visual field correction on the background video to obtain a processed background video;

a color space conversion module, configured to convert the original rendering color and the processed background video color from an RGB color space to a CIELAB color space, and further configured to convert the optimal rendering color from the CIELAB color space to the RGB color space;

an optimal rendering color calculation module, configured to find an optimal rendering color based on the original rendering color and the processed video color in the CIELAB space according to a set color difference constraint, a chromaticity saturation constraint, a brightness constraint and a just noticeable difference constraint; and a rendering module, configured to replace the original rendering color by the optimal rendering color in the RGB color space for real-time rendering.

It should be noted that when the color contrast enhanced rendering device suitable for the optical see-through head-mounted display provided by the above embodiment performs color contrast enhanced rendering, division of the foregoing function modules should be used as an example for description, and the foregoing functions may be allocated to and completed by different function modules as required. That is, an internal structure of a server was divided into different function modules, to complete all or some of the functions described above. That is, an internal structure of a terminal or a server was divided into different function modules to complete all or some of the functions described above. In addition, the color contrast enhanced rendering device suitable for the optical see-through head-mounted display provided by the above embodiment belongs to the same concept as the color contrast enhanced rendering method suitable for the optical see-through head-mounted display provided by the above embodiment. The details of the specific implementation process of the color contrast enhanced rendering device suitable for the optical see-through head-mounted display were shown in the embodiment of the color contrast enhanced rendering method suitable for the optical see-through head-mounted display, which are not elaborated herein.

An embodiment further provides a color contrast enhanced rendering system suitable for an optical see-through head-mounted display, including a processor, a memory and a computer program which was stored in the processor and capable of being executed by the processor, wherein the computer program, when being executed by the processor, implements the above color contrast enhanced rendering method suitable for the optical see-through head-mounted display.

The memory may include one or more computer readable storage mediums that may be non-transitory. The memory may further include a high-speed random access memory and a nonvolatile memory, such as one or more disk storage devices and flash storage devices. In some embodiments, the non-transitory computer readable storage mediums in the memory were used for storing at least one instruction which is used for being executed by the processor to implement the color contrast enhanced rendering method suitable for the optical see-through head-mounted display provided by the method embodiments of the present application.

The above specific embodiments have described the technical solutions and beneficial effects of the present invention in detail. It should be understood that the above is only the most preferred embodiment of the present invention and is not used to limit the present invention. Any modification, supplement and equivalent substitution made within the principle scope of the present invention should be included in the protection scope of the present invention.

What is claimed is:

1. A color contrast enhanced rendering method suitable for an optical see-through head-mounted display, the color contrast enhanced rendering method comprising the following steps:
(1) acquiring a background environment in real time to obtain a background video and pre-processing the background video to obtain a processed background video;
(2) converting an original rendering color and a processed background video color to a CIELAB color space;
(3) calculating an ideal optimal rendering color by calculating, $$I = -\frac{B}{dist(B, O)} = -norm(\overrightarrow{OB}),$$

in the CIELAB color space, and then sequentially applying a color difference constraint, a chromaticity saturation constraint, a brightness constraint and a just noticeable difference constraint to the ideal optimal rendering color to obtain an optimal rendering color,
wherein I and B respectively represent three-dimensional coordinates of the ideal optimal rendering color and the background video color subjected to Gaussian blur in the CIELAB color space which is scaled to a unit sphere, O represents an origin of coordinates and, O is also a center of the unit sphere, dist(•) represents an Euclidean distance between two points in the space, norm(•) represents that a vector is normalized, $\overrightarrow{OB}$ represents a vector with a starting point at O and an end point at B; and
(4) after converting the optimal rendering color from the CIELAB color space back to the original rendering color space, replacing the original rendering color with the converted optimal rendering color for real-time rendering.

2. The color contrast enhanced rendering method suitable for the optical see-through head-mounted display according to claim 1, wherein the step of pre-processing the background video comprises:
performing Gaussian blur processing on the background video; and
performing visual field correction on the background video subjected to Gaussian processing to realize pixel accuracy one-to-one mapping of a frame image of the background video and a rendering picture, a correction formula being:

$$\begin{cases} u = s_u x + b_u \\ v = s_v y + b_v \end{cases}$$

wherein u and v respectively represent texture coordinates of the rendering picture in horizontal and vertical directions, x and y respectively represent texture coordinates of the frame image of the background video in the horizontal and vertical directions, $s_u$ and $s_v$ respectively represent scaling coefficients of the texture coordinates of the frame image of the background video in the horizontal and vertical directions, and $b_u$ and $b_v$ respectively represent offsets of the texture coordinates of the frame image of the background video in the horizontal and vertical directions.

3. The color contrast enhanced rendering method suitable for the optical see-through head-mounted display according to claim 1, wherein the step (2) specifically comprises:
(2-1) converting the original rendering color and the processed background video color from their own original color spaces to the CIELAB color space; and
(2-2) scaling the three-dimensional coordinates of the original rendering color and the background video color in the CIELAB color space to a unit sphere range, that is, an Euclidean distance from the three-dimensional coordinates corresponding to any color in the CIELAB color space after scaling to the origin being less than or equal to 1.

4. The color contrast enhanced rendering method suitable for the optical see-through head-mounted display according to claim 1, wherein in the step (3),
the color difference constraint means that a color difference of the optimal rendering color and the original rendering color should be kept within a certain range, and the color different constraint is defined as follows:

$$\Delta E^*_{ab}(l_{opt}, l_d) \leq \lambda_E$$

wherein $\Delta_E*_{ab}(\bullet)$ represents the color difference of the two colors in the CIELAB color space, $l_{opt}$ and $l_d$ respectively represent the optimal rendering color and the original rendering color, and $\lambda_E$ represent a color difference threshold with a positive value;

the chromaticity saturation constraint means that a chromaticity saturation of the optimal rendering color should not be reduced, and the chromaticity saturation constraint is defined as follows:

$$ch_{opt} - ch_d \geq 0$$

wherein $ch_{opt}$ and $ch_d$ respectively represent chromaticity saturations of the optimal rendering color and the original rendering color in the CIELAB color space;

the brightness constraint means that a brightness difference of the optimal rendering color and the original rendering color should be kept within a certain range, and the brightness constraint is defined as follows:

$$\Delta L^*(l_{opt}, l_d) \leq \lambda_L$$

wherein $\Delta L^*(\bullet)$ represents the brightness difference of the two colors in the CIELAB color space, and $\lambda_L$ represents a brightness threshold with a positive value; and the just noticeable difference constraint means that the optimal rendering color and the background video color should have a color difference distinguishable by human eyes, and the just noticeable difference constraint is defined as follows:

$$\Delta E^*_{ab}(l_{opt}, l_b) \leq \lambda_{JND}$$

wherein $l_b$ represents the background video color, and $\Delta_{JND}$ represents a just noticeable difference with a positive value.

5. The color contrast enhanced rendering method suitable for the optical see-through head-mounted display according to claim 1, wherein the step of sequentially applying a color difference constraint, a chromaticity saturation constraint, a brightness constraint and a just noticeable difference constraint to the ideal optimal rendering color to obtain an optimal rendering color comprises:

applying the color difference constraint to the ideal optimal rendering color, the method for applying the color difference constraint being as follows:

$$\overrightarrow{DE} = \min(\mathrm{dist}(D,I), \lambda'_E) \cdot \mathrm{norm}(\overrightarrow{DI})$$

wherein D and E respectively represent three-dimensional coordinates of the original rendering color and the ideal optimal rendering color to which the color difference constraint is applied in the CIELAB color range scaled to the unit sphere, min(•) represents taking a smaller value of the two three-dimensional coordinates, $\lambda'_E$ represents a color different threshold scaled to the unit sphere range, and $\overrightarrow{DI}$ represents a three-dimensional vector with a starting point at D and an end point at I;

continuing to apply the chromaticity saturation constraint to the ideal optimal rendering color to which the color difference constraint is applied, and making a superscript ' represent taking a projection vector of a vector on a a*Ob* plane in the CIELAB color space, the method for applying the chromaticity saturation constraint being as follows:

$$\overrightarrow{DC} = t_{ch} \cdot \overrightarrow{DE'}_{ch} + \overrightarrow{DE'}_h$$

$$t_{ch} = \begin{cases} 1, & \text{if } \theta_{ch} \leq 90° \\ 0, & \text{if } \theta_{ch} > 90° \end{cases}$$

wherein $\overrightarrow{DC}$ represents a $\overrightarrow{DE'}$ vector after the chromaticity saturation constraint is applied, $\overrightarrow{DE'}_{ch}$ represents a vector component of a $\overrightarrow{DE'}$ vector in a $\overrightarrow{OD'}$ vector direction, that is, a variation vector of the chromaticity saturation constraint, $\overrightarrow{DE'}_h$ represents another vector component of the $\overrightarrow{DE'}$ in a direction vertical to the $\overrightarrow{DE'}_{ch}$ vector, that is, $\overrightarrow{DE'}_h = \overrightarrow{DE'} - \overrightarrow{DE'}_{ch}$, and $\theta_{ch}$ represents an angle from the $\overrightarrow{OD'}$ vector to the $\overrightarrow{DE'}$ vector;

continuing to apply the brightness constraint to the ideal optimal rendering color to which the color different constraint and the chromaticity saturation constraint were applied, the method for applying the brightness constraint being as follows:

$$\overrightarrow{DL} = (1 - |\cos \theta_l|) \cdot \overrightarrow{DE}_{L^*}$$

wherein $\overrightarrow{DE}_L$ represents a vector component of a $\overrightarrow{DE}$ vector on a L* axis in the CIELAB color space scaled to the unit sphere, $\overrightarrow{DL}$ represents a $\overrightarrow{DE}_{L^*}$ vector after the brightness constraint is applied, $\theta_l$ represents an angle from a positive direction of the L* axis to the $\overrightarrow{DE}$ vector; and continuing to apply the just noticeable difference constraint to the ideal optimal rendering color to which the color different constraint, the chromaticity saturation constraint and the brightness constraint are applied, the method for applying the just noticeable difference constraint being as follows:

$$\overrightarrow{DP} = \overrightarrow{DC} + \overrightarrow{DL}$$

$$L_{opt} = D + r \cdot \overrightarrow{DP}$$

wherein $L_{opt}$ represents three-dimensional coordinates of the optimal rendering color in the CIELAB color space scaled to the unit sphere, and r represents a scaling coefficient: when an Euclidean distance from P to B is less than the just noticeable difference scaled to the unit sphere range, r is less than 1, so as to reduce a module length of a $\overrightarrow{DP}$ vector with a starting point at D and an end point at P, so that an Euclidean distance from the end point of the reduced $\overrightarrow{DP}$ vector to B is not less than the just noticeable difference scaled to the unit sphere range, and if an Euclidean distance from the P to the B is already greater than or equal to the just noticeable difference scaled to the unit sphere unit, r is equal to 1.

6. The color contrast enhanced rendering method suitable for the optical see-through head-mounted display according to claim 1, wherein the step (4) specifically comprises:

(4-1) scaling the optimal rendering color in the CIELAB color space scaled to the unit sphere range back to a coordinate range of the original CIELAB color space;

(4-2) converting the optimal rendering color in the CIELAB color space back to the original rendering color space; and (4-3) replacing the original rendering color with the converted optimal rendering color for real-time rendering.

7. A color contrast enhanced rendering device suitable for an optical see-through head-mounted display, comprising:
- an acquisition and processing module configured to acquire a background environment in real time to obtain a background video and perform Gaussian blur and visual field correction on the background video to obtain a processed background video;
- a color space conversion module configured to convert an original rendering color and a processed background video color to a CIELAB color space and further configured to convert the optimal rendering color from the CIELAB color space to the original rendering color space;
- an optimal rendering color calculation module configured to calculate an ideal optimal rendering color by calculating, $$I = -\frac{B}{dist(B, O)} = -norm(\overrightarrow{OB}),$$

in the CIELAB color space and then sequentially apply a color difference constraint, a chromaticity saturation constraint, a brightness constraint and a just noticeable difference constraint to the ideal optimal rendering color to obtain an optimal rendering color, wherein I and B respectively represent three-dimensional coordinates of the ideal optimal rendering color and the background video color subjected to Gaussian blur in the CIELAB color space which is scaled to a unit sphere, O represents an origin of coordinates and, O is also a center of the unit sphere, dist(•) represents an Euclidean distance between two points in the space, norm(•) represents that a vector is normalized, $\overrightarrow{OB}$ represents a vector with a starting point at O and an end point at B; and a rendering module configured to replace the original rendering color with the converted optimal rendering color for real-time rendering.

8. A color contrast enhanced rendering system suitable for an optical see-through head-mounted display, comprising a processor, a memory and a computer program stored in the processor and capable of being executed by the processor, wherein the computer program, when executed by the processor, implements the color contrast enhanced rendering method suitable for the optical see-through head-mounted display as defined in claim 1.

* * * * *